US010425599B2

(12) United States Patent
Swami et al.

(10) Patent No.: US 10,425,599 B2
(45) Date of Patent: Sep. 24, 2019

(54) EXPOSURE SELECTOR FOR HIGH-DYNAMIC RANGE IMAGING AND ASSOCIATED METHOD

(71) Applicant: OmniVision Technologies, Inc., Santa Clara, CA (US)

(72) Inventors: Sarvesh Swami, San Jose, CA (US); Donghui Wu, San Mateo, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 310 days.

(21) Appl. No.: 15/421,949

(22) Filed: Feb. 1, 2017

(65) Prior Publication Data

US 2018/0220054 A1  Aug. 2, 2018

(51) Int. Cl.
*H04N 5/355* (2011.01)
*G06T 5/50* (2006.01)
(Continued)

(52) U.S. Cl.
CPC ......... *H04N 5/35536* (2013.01); *G06T 5/009* (2013.01); *G06T 5/50* (2013.01);
(Continued)

(58) Field of Classification Search
CPC ............. H04N 5/35536; H04N 5/2355; H04N 5/2351; H04N 5/355; H04N 5/35545;
(Continued)

(56) References Cited

U.S. PATENT DOCUMENTS

2012/0288217 A1* 11/2012 Zhai .................... G06T 5/50
382/294
2013/0100314 A1* 4/2013 Li ...................... H04N 5/2353
348/229.1
(Continued)

FOREIGN PATENT DOCUMENTS

CN  106169182 A  11/2016

OTHER PUBLICATIONS

English translation of CN 106169182, Nov. 30, 2016, retrieved Jan. 31, 2019 (Year: 2016).*
Taiwan Patent Application No. 106146031, English translation of Office Action dated Aug. 6, 2018, 2 pages.

*Primary Examiner* — Albert H Cutler
(74) *Attorney, Agent, or Firm* — Lathrop Gage LLP

(57) ABSTRACT

A method for generating an HDR image includes (i) generating, from a plurality of single-exposure images of a scene, having a respective one of a plurality of exposure values, a sharpness map of sharpness values of the single-exposure images, and (ii) generating, from the plurality of single-exposure images, an exposure-value map of composite exposure values of the single-exposure images. The method also includes (iii) determining an optimal exposure value from the sharpness map and the exposure-value map, and (iv) generating the HDR image by combining a reference image of the scene, captured with the optimal exposure value, and at least two of the plurality of single-exposure images. An exposure selector for generating an HDR image, from the plurality of single-exposure images, includes a memory and a microprocessor. The memory stores non- (Continued)

transitory computer-readable instructions and is adapted to store the plurality of single-exposure images. The microprocessor is adapted to execute the aforementioned method.

23 Claims, 11 Drawing Sheets

(51) Int. Cl.
  *G06T 5/00* (2006.01)
  *H04N 5/235* (2006.01)
(52) U.S. Cl.
  CPC . *H04N 5/2355* (2013.01); *G06T 2207/10016* (2013.01); *G06T 2207/10024* (2013.01); *G06T 2207/20021* (2013.01); *G06T 2207/20192* (2013.01); *G06T 2207/20208* (2013.01); *H04N 5/2351* (2013.01)
(58) Field of Classification Search
  CPC .......... H04N 5/35554; H04N 5/35572; H04N 5/35581; G06T 5/50; G06T 5/009; G06T 2207/20208; G06T 2207/20192; G06T 2207/20021; G06T 2207/10024; G06T 2207/10016
  See application file for complete search history.

(56) References Cited

U.S. PATENT DOCUMENTS

| | | | |
|---|---|---|---|
| 2014/0267883 A1* | 9/2014 | Vidal-Naquet | G06T 7/00 348/362 |
| 2014/0307960 A1* | 10/2014 | Sharma | H04N 5/23229 382/162 |
| 2014/0347521 A1* | 11/2014 | Hasinoff | H04N 5/2355 348/239 |
| 2015/0043811 A1* | 2/2015 | Prabhudesai | G06T 5/008 382/164 |
| 2015/0049215 A1* | 2/2015 | Kuang | H04N 5/2355 348/231.6 |
| 2015/0054977 A1* | 2/2015 | Hozumi | H04N 5/2355 348/222.1 |
| 2015/0302562 A1* | 10/2015 | Zhai | H04N 19/46 382/233 |
| 2015/0348242 A1* | 12/2015 | Molgaard | G06T 5/50 348/241 |
| 2015/0350509 A1* | 12/2015 | Tico | H04N 5/23277 348/362 |
| 2016/0057328 A1* | 2/2016 | Kimura | H04N 5/23212 348/362 |
| 2017/0064179 A1* | 3/2017 | Richards | G06K 9/4642 |
| 2017/0359498 A1* | 12/2017 | Benchemsi | G06T 5/009 |
| 2018/0039821 A1* | 2/2018 | Gren | G06T 7/30 |

* cited by examiner

EXPOSURE SELECTOR FOR HIGH-DYNAMIC RANGE IMAGING AND ASSOCIATED METHOD

BACKGROUND

Many consumer electronics products include at least one camera. These include tablet computers, mobile phones, and smart watches. In such products, and in digital still cameras themselves, high-dynamic range (HDR) functionality enables images of scenes having an increased dynamic range of luminosity. Some HDR images are synthesized from a combination of multiple images.

SUMMARY OF THE EMBODIMENTS

As used herein, "multiple-exposure image" includes an image taken in a manner such that different pixels of the image sensor capturing the image are exposed according to different exposure values. "Single exposure image" includes an image taken in a manner such that all pixels of the image sensor, or at least those pixels corresponding to the given image captured, are exposed according to the same exposure value. Some HDR images are synthesized from a combination of a multiple-exposure image with low-resolution and a higher-resolution single exposure image. The quality of such an HDR image partly depends on the exposure time of the single-exposure image. Embodiments herein determine an optimal exposure time of the single-exposure image.

In a first embodiment, a method for generating an HDR image includes (i) generating a sharpness map of sharpness values from a plurality of single-exposure images of a scene, each single-exposure image having a respective one of a plurality of exposure values, and (ii) generating, from the plurality of single-exposure images, an exposure-value map of composite exposure values of the single-exposure images. The method also includes (iii) determining an optimal exposure value from the sharpness map and the exposure-value map, and (iv) generating the HDR image by combining a reference image of the scene, captured with the optimal exposure value, and at least two of the plurality of single-exposure images.

In a second embodiment, an exposure selector includes a memory and a microprocessor. The memory stores non-transitory computer-readable instructions and is adapted to store the plurality of single-exposure images, of a scene, having a respective one of a plurality of exposure times. The microprocessor is adapted to: (i) generate, from the plurality of single-exposure images of the scene, a sharpness map of sharpness values of the single-exposure images, (ii) generate, from the plurality of single-exposure images, an exposure-value map of composite exposure values of the single-exposure images, (iii) determine an optimal exposure value from the sharpness map and the exposure-value map, and (iv) generate the HDR image by combining a reference image of the scene, captured with the optimal exposure value, and at least two of the plurality of single-exposure images.

DETAILED DESCRIPTION OF THE EMBODIMENTS

Figure 1:
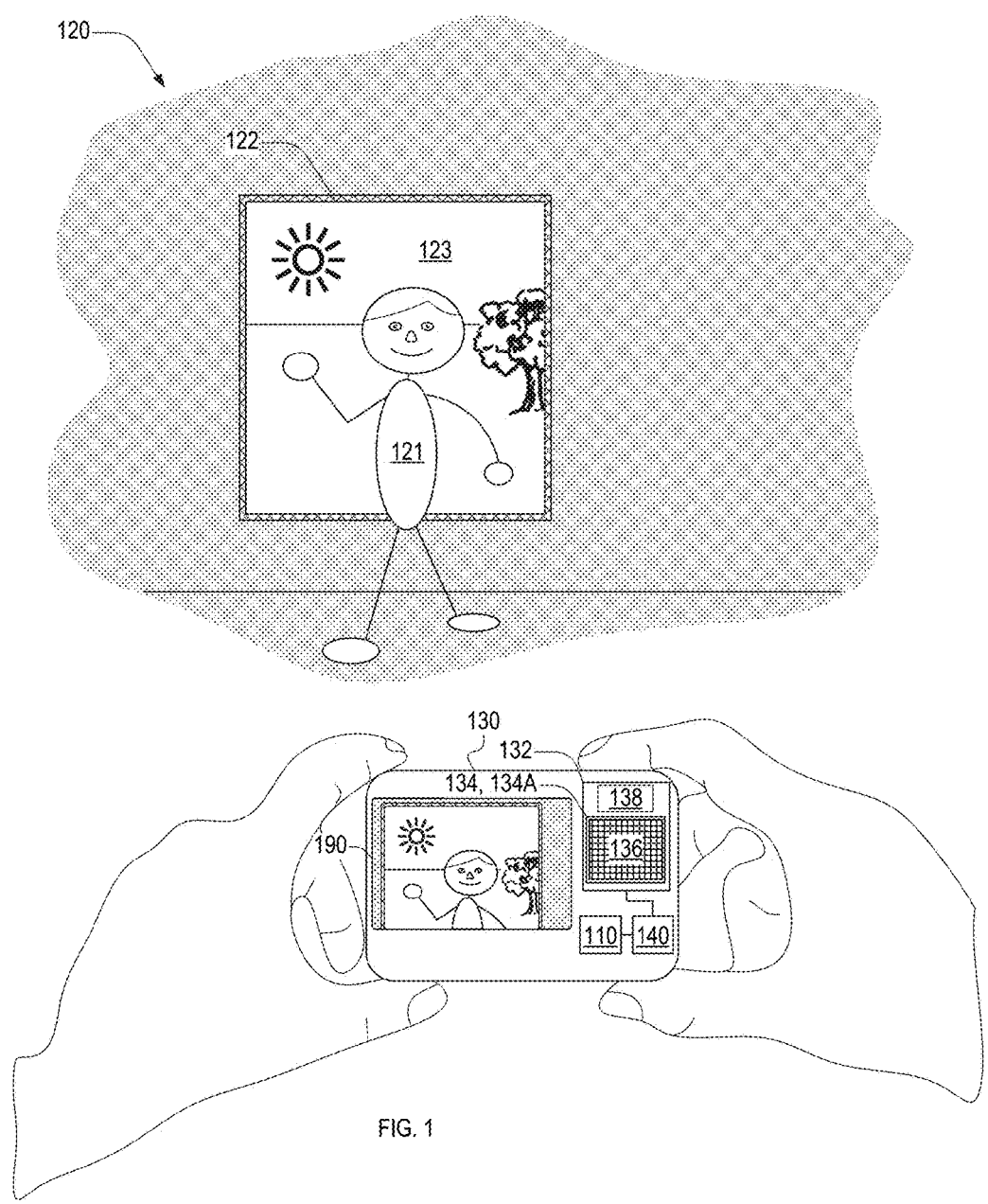
FIG. 1 depicts a camera imaging a scene having a high dynamic range of luminance.

FIG. 1 depicts a camera 130 imaging a scene 120 having a high dynamic range of luminance. Scene 120 includes a person 121 in front of a window 122, through which a sunny scene 123 is visible. Camera 130 includes an imaging lens (not shown), an image sensor 132, a memory 110, and a microprocessor 140 communicatively coupled to the image sensor. Image sensor 132 includes a pixel array 134A and may include a color filter array (CFA) 136 thereon. Pixel array 134A includes a plurality of pixels 134, not shown in FIG. 1 for clarity of illustration. Each color filter of CFA 136 is aligned with a respective pixel 134 of pixel array 134A. The imaging lens images scene 120 onto image sensor 132. Image sensor 132 also includes circuitry 138 that includes at least one analog-to-digital converter.

Indoor lighting, not shown, illuminates the front of person 121 facing the camera while sunlight illuminates sunny scene 123. In scene 120, person 121 and sunny scene 123 have respective differing luminosities. Since the sunlight is significantly brighter than the indoor lighting, luminosity of sunny scene 123 far exceeds luminosity of person 121 such that scene 120 has a high dynamic range of luminosity. Standard digital imaging enables capture of scene 120 using a single exposure time optimized for either (but not both) luminosity of person 121 or sunny scene 123. When the exposure time is optimized for luminosity of person 121, person 121 is properly exposed while sunny scene 123 is overexposed. When the exposure time is optimized for luminosity of sunny scene 123, sunny scene 123 is properly exposed while person 121 is underexposed.

Figure 2:
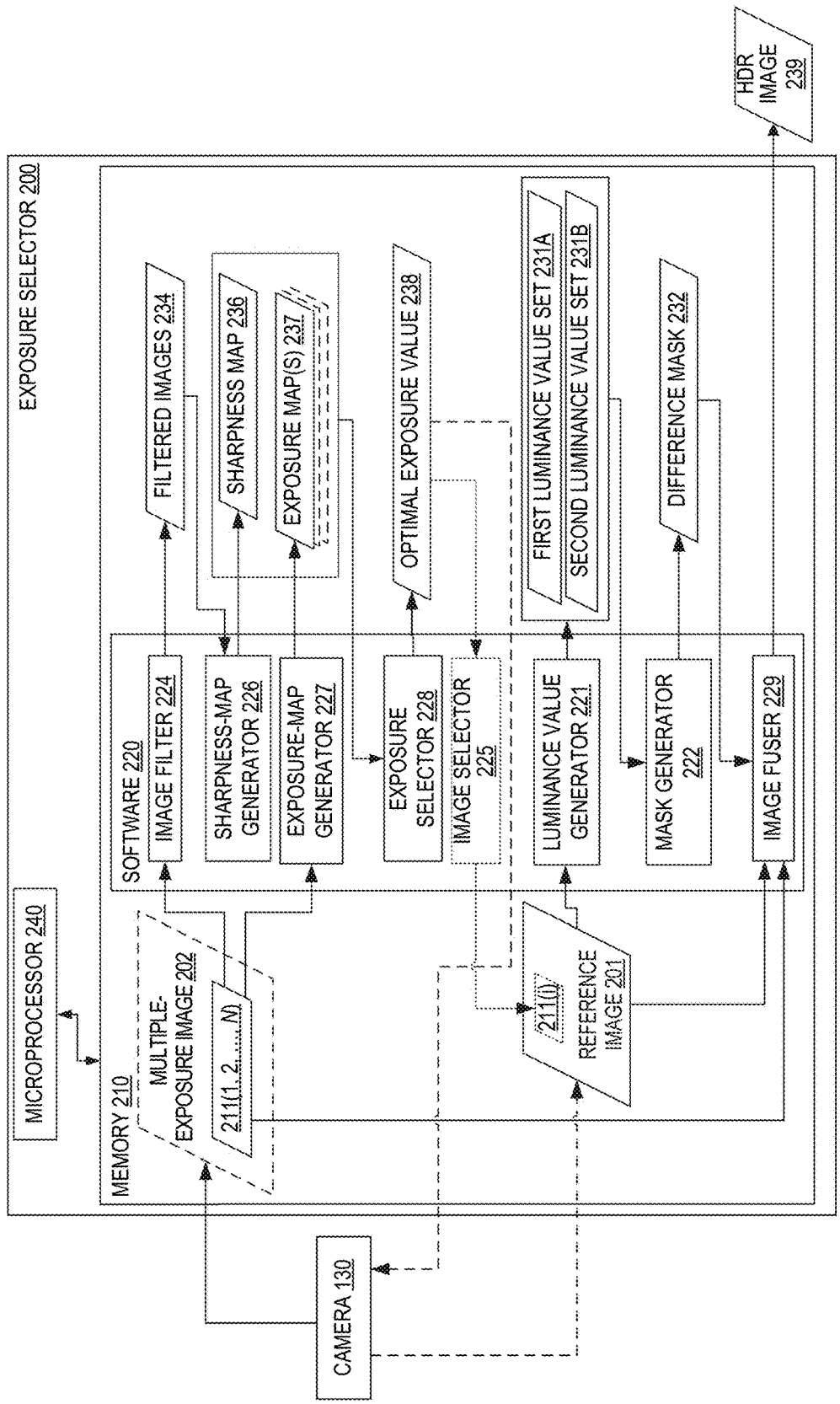
FIG. 2 shows an embodiment of an exposure selector that may be implemented within the camera of FIG. 1.

FIG. 2 shows an exemplary exposure selector 200 that combines a reference image 201 and a plurality of single-exposure images 211 to generate an HDR image 239. Exposure selector 200 may be implemented within camera 130. Images 201 and 211 may be of the same scene, e.g., scene 120. Reference image 201 may be a single-exposure image. Single-exposure images 211 include images 211(1), 211(2), . . . , 211(N), where N is a positive integer. Single-exposure images 211 may form a multiple-exposure image 202, which is a composite of single-exposure images 211.

Single-exposure images 211 may be captured simultaneously or sequentially by camera 130. Reference image 201 may have a higher resolution than each single-exposure image 211, for example, when camera 130 captures single-exposure images 211 simultaneously. Reference image 201 may be one of single-exposure images 211, for example, when camera 130 captures single-exposure images 211 sequentially.

Exposure selector 200 includes a microprocessor 240 and a memory 210 that stores software 220 that includes computer-readable instructions. Microprocessor 240 may be a digital signal processor such as an image processor. Memory 210 may be transitory and/or non-transitory and may include one or both of volatile memory (e.g., SRAM, DRAM, or any combination thereof) and nonvolatile memory (e.g., FLASH, ROM, magnetic media, optical media, or any combination thereof).

Memory 210 and microprocessor 240 may function as memory 110 and microprocessor 140, respectively, of camera 130, FIG. 1. Microprocessor 240 is adapted to execute the instructions to perform functions of exposure selector 200 as described herein. Memory 210 stores one or both of reference image 201 and single-exposure images 211. Memory 210 may store images 201 and 211 in either an image file format, such as JPEG and TIFF, or a raw image format, such as TIFF/EP and Digital Negative (DNG).

Software 220 includes one or more of the following software modules for producing respective data outputs. An image filter 224 is configured to generate filtered images 234 from single-exposure images 211. A sharpness-map generator 226 is configured to generate sharpness map 236 from filtered images 234. An exposure-map generator 227 is configured to generate at least one exposure map 237 from single-exposure images 211. Exposure selector 228 is configured to generate an optimal exposure value 238 from sharpness map 236 and the at least one exposure map 237.

Camera 130 may use optimal exposure value 238 to generate reference image 201 having said optimal exposure value, for example, when single-exposure images 211(1-N) are captured simultaneously. Alternatively, exposure selector 200 may include an image selector 225 which, based on optimal exposure value 238, selects one of single-exposure images 211(1-N) to function as reference image 201.

A luminance value generator 221 is configured to generate, from images 201 and 211, a first luminance value set 231A and a second luminance value set 231B. A mask generator 222 is configured to generate a difference mask 232 from luminance value sets 231A, 231B. With difference mask 232, image fuser 229 combines reference image 201 and single-exposure images 211 to generate HDR image 239.

Figure 3:
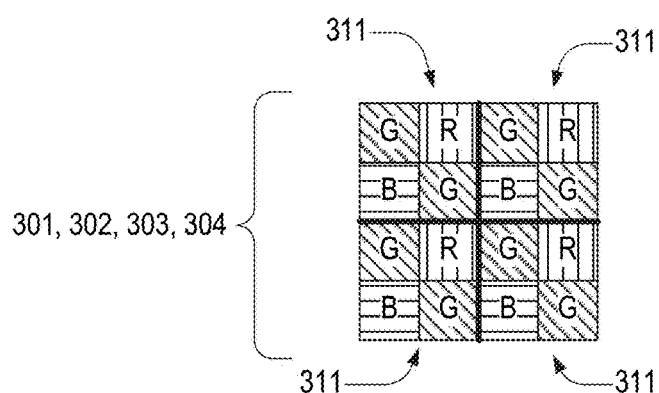
FIG. 3 depicts a color filter array (CFA), which is an example of the CFA of the camera of FIG. 1.

FIG. 3 depicts a CFA 336, which is an example of CFA 136 of camera 130. CFA 336 includes an interleaved array of color filter cells 301, 302, 303, and 304. Each color filter cell 301-304 is a two-by-two array of color filters, such as a Bayer cell 311, such that CFA 336 is a Bayer array. Each Bayer cell 311 includes one red color filter ("R"), two green color filters ("G"), and one blue color filter ("B"). While color filter cells 301-304 are structurally identical, they are differentiated herein because, as discussed below, image sensor pixels beneath each filter cell 301-304 have different exposure times when capturing single-exposure images 211. Herein, a red pixel, a green pixel, and a blue pixel denote imager sensor pixels aligned beneath a red color filter, a green color filter, and a blue color filter, respectively.

It should be appreciated that other CFA arrangements, and exposure value arrangements, may be utilized without departing from the scope hereof. For example, a multiple-exposure image may correspond to fewer or more than four exposure times. For example, multiple-exposure image may be formed from nine images having different exposure times, corresponding to nine color filter cells, in a tiled three-by-three array, each having a different exposure time when capturing the multiple-exposure image.

Figure 4C:
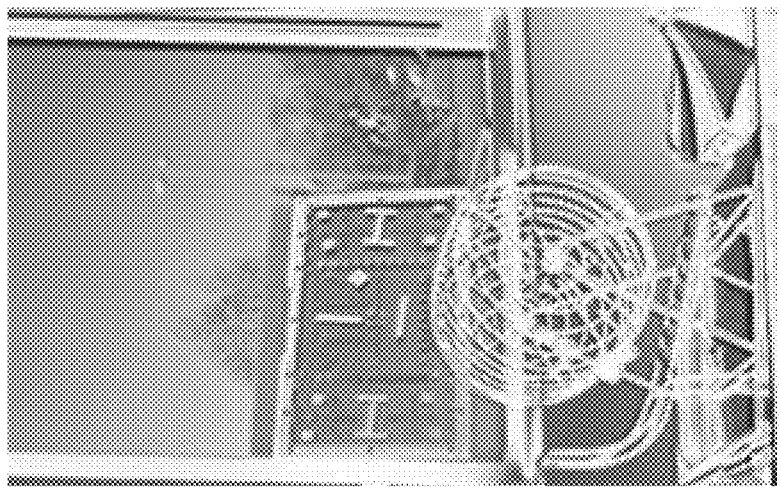
FIGS. 4A-4C depict, respectively, an exemplary single-exposure image and an exemplary multiple-exposure image, and an exemplary difference mask formed therefrom.
Figure 4B:
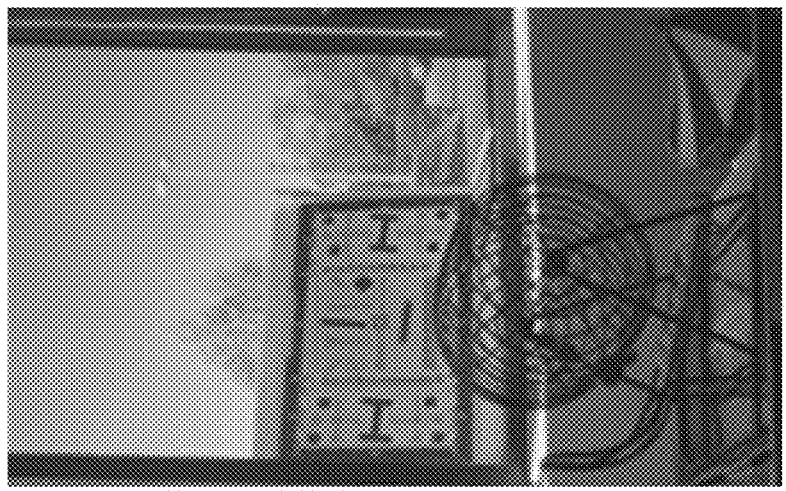
Figure 4A:
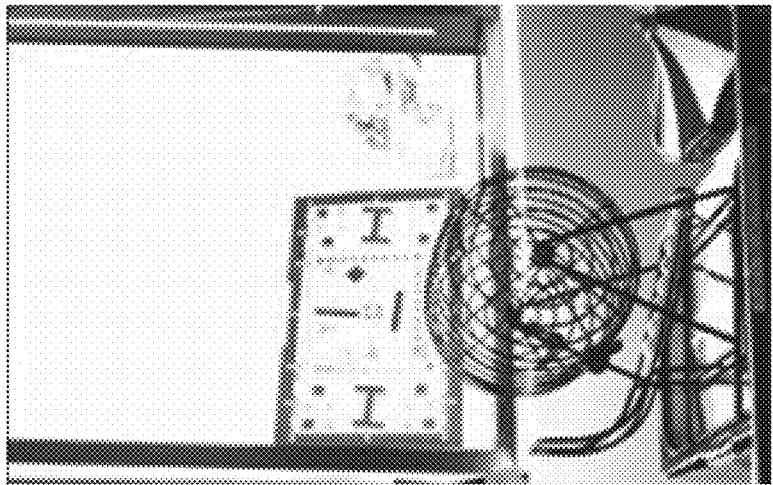

FIGS. 4A and 4B depict an exemplary single-exposure image 401 and an exemplary multiple-exposure image 402, respectively of a same scene captured by camera 130 that includes CFA 336 of FIG. 3. Images 401 and 402 are examples of reference image 201 and a multiple-exposure image 202, respectively. Single-exposure image 401 results from camera 130 capturing the scene with pixels 134 beneath each color filter cell 301-304 having the same exposure time $t_{401}$.

Multiple-exposure image 402 results from camera 130 capturing the scene with pixels beneath each color filter cell 301-304 having a respective exposure time $t_1$, $t_2$, $t_3$, and $t_4$, where $t_1 < t_2 < t_3 < t_4$ and subscripts 1-4 are exposure indices k. Exposure time $t_k$ and corresponding exposure index k are examples of corresponding exposure values. An exposure value as used herein may also be a quantity derived from one or more of an exposure index and an exposure time.

Multiple-exposure image 402 is an interleaved composite of four single-exposure images (611, 612, 613, and 614 of FIG. 6) having respective exposure times $t_{1-4}$, which enables multiple-exposure image to have a higher dynamic range than single-exposure image 401. Single-exposure images 611-614 are examples of single-exposure images 211, and are captured by pixels 134 beneath color filter cells 301-304, respectively. Accordingly, each of single-exposure images 611-614 has lower resolution than single-exposure image 401. Hence, while multiple-exposure image 402 has a larger dynamic range than single-exposure image 401, it also has a lower resolution.

FIG. 4C depicts a difference mask 403 that is an absolute difference between respective luminance values of single-exposure image 401 and multiple-exposure image 402. Luminance values of single-exposure image 401 and multiple-exposure image 402 are examples of first luminance value set 231A and second luminance value set 231B, respectively. Difference mask 403 is an example of difference mask 232 stored in memory 210 of exposure selector 200, FIG. 2. The luminance values used to generate difference mask 403 are based on the following relationship between a luminance value Y and pixel values R, G, and B of red, green, and blue sensor pixels used to capture images 401 and 402: Y=0.30R+0.59G+0.11B. Without departing from the scope hereof, coefficients of R, G, and B used to determine luminance value Y may vary from those presented. White regions of difference mask 403 denote minimum luminance differences between images 401 and 402, while black regions of difference mask 403 denote maximum luminance differences.

In the above example, luminance value sets 231A, 231B are generated from R, G, and B values of images 401 and 402. Images 401 and 402 result from demosaicing "raw" sensor pixel values from image sensor 132. Alternatively, luminance value sets 231A, 231B may be generated directly from raw sensor pixel values from image sensor 132, that is, independent of a demosaicing process. For example, when CFA 136 is a Bayer pattern, raw sensor pixel values from image sensor 132 includes pixel values corresponding to red, green, and blue pixels. Luminance value sets 231A, 231B may be generated from these pixel values and be independent of demosaicing used to generate images 201 and 211.

Figure 5A:
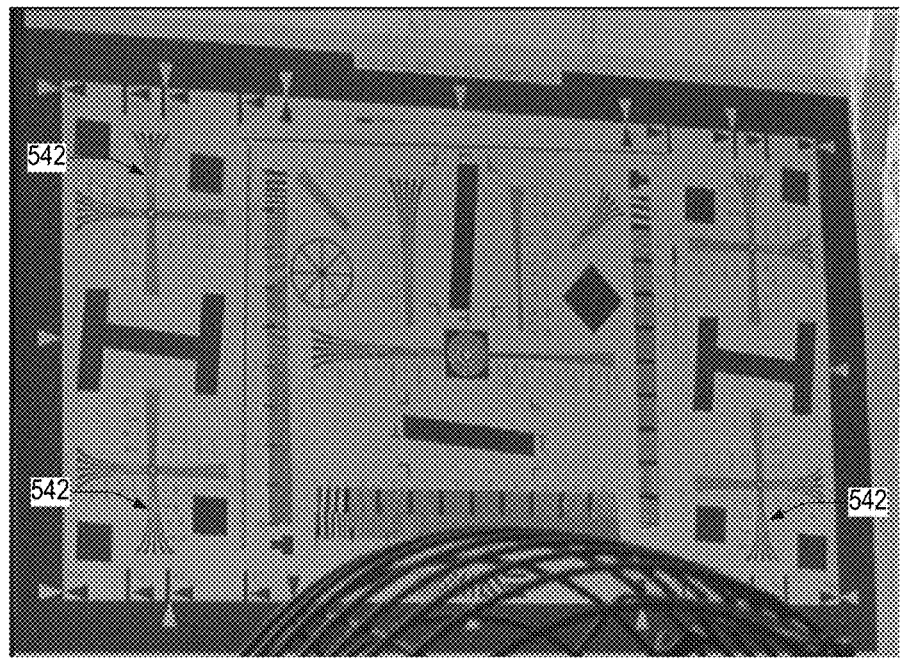
FIG. 5A illustrates an exemplary combined image formed from the multiple-exposure image of FIG. 4B and exemplary single-exposure images having a second exposure time.

FIG. 5A depicts a HDR image 540, which is a weighted sum of single-exposure image 401, multiple-exposure image 402, and difference mask 403. In an embodiment of exposure selector 200, image fuser 229 implements the weighted sum. By including both images 401 and 402, HDR image 540 has both the high-resolution of single-exposure image 401 and the high dynamic range of multiple-exposure image 402. Equation (1) is a mathematical representation of HDR image 540, where for HDR image 540, data arrays $M_\Delta$, $I_1$, $I_2$, and $I_\Sigma$ represent difference mask 403, single-exposure image 401, multiple-exposure image 402, and HDR image 540 respectively.

$$I_\Sigma = I_1(1-M_\Delta) + I_2 M_\Delta \qquad \text{Eq. (1)}$$

For optimal combination of images 401 and 402, exposure time $t_{401}$ of single-exposure image 401 is at least approximately equal to one of exposure times $t_1$, $t_2$, $t_3$, and $t_4$ of multiple-exposure image 402. Two quantities that differ by less than five percent are examples of "approximately equal" quantities. In the example of HDR image 540, exposure time $t_{401}$ equals exposure time $t_4$, the longest exposure time of image of multiple-exposure image 402.

In the example of HDR image 540, exposure time $t_{401}$ may be chosen to equal the same one of exposure times $t_{1-4}$ regardless of any properties of images 401 and 402. However, Applicant has determined that for optimal quality of HDR image 540, the best choice of exposure time $t_{401}$—that is, one of exposure times $t_1$, $t_2$, $t_3$, and $t_4$—depends on determining proper exposure times of in-focus regions (herein also "sharp" regions) of multiple-exposure image 402. A proper exposure time of an in-focus region results in a combined image with in-focus regions that are neither over-exposed nor under-exposed. For example, HDR image 540 has overexposed regions 542 that blur out test-chart features.

Figure 5B:
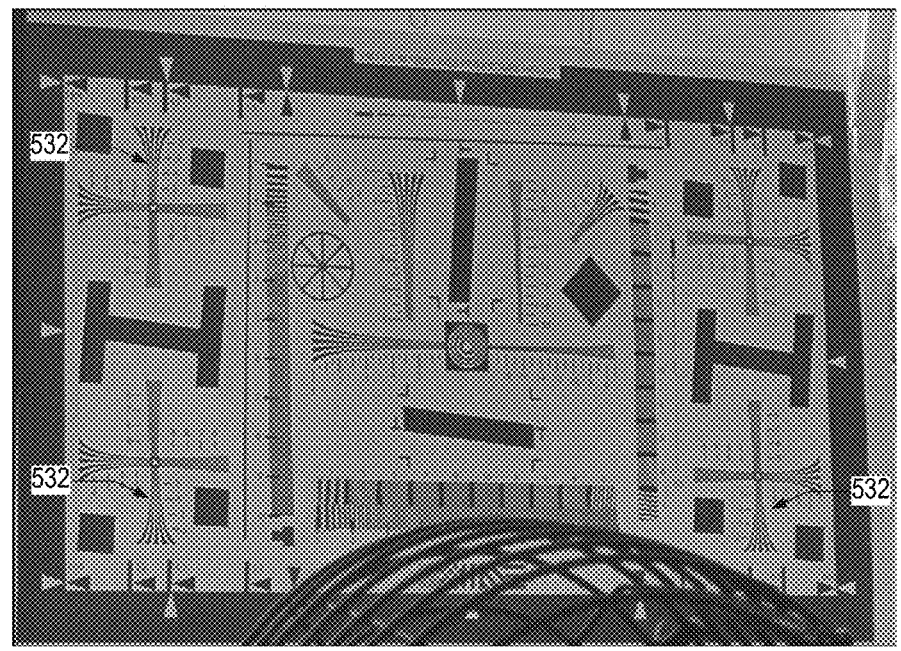
FIG. 5B illustrates an exemplary combined image formed from the multiple-exposure image of FIG. 4B and single-exposure images having a second exposure time.

In the example of multiple-exposure image 402, the best choice of exposure time $t_{401}$, of candidate exposure times $t_{1-4}$, may be $t_{401}=t_3$, which results in a HDR image 530 shown in FIG. 5B. Equation (1) is a mathematical representation of HDR image 530, where for HDR image 530, data arrays $M_\Delta$, $I_1$, $I_2$, and $I_\Sigma$ represent difference mask 403, single-exposure image 401 (with $t_{401}=t_3$), multiple-exposure image 402, and HDR image 530 respectively. In HDR image 530, regions 532 corresponding to regions 532 are less exposed such that the test-chart features are resolvable. HDR image 530 is an example of HDR image 239.

Figure 6:
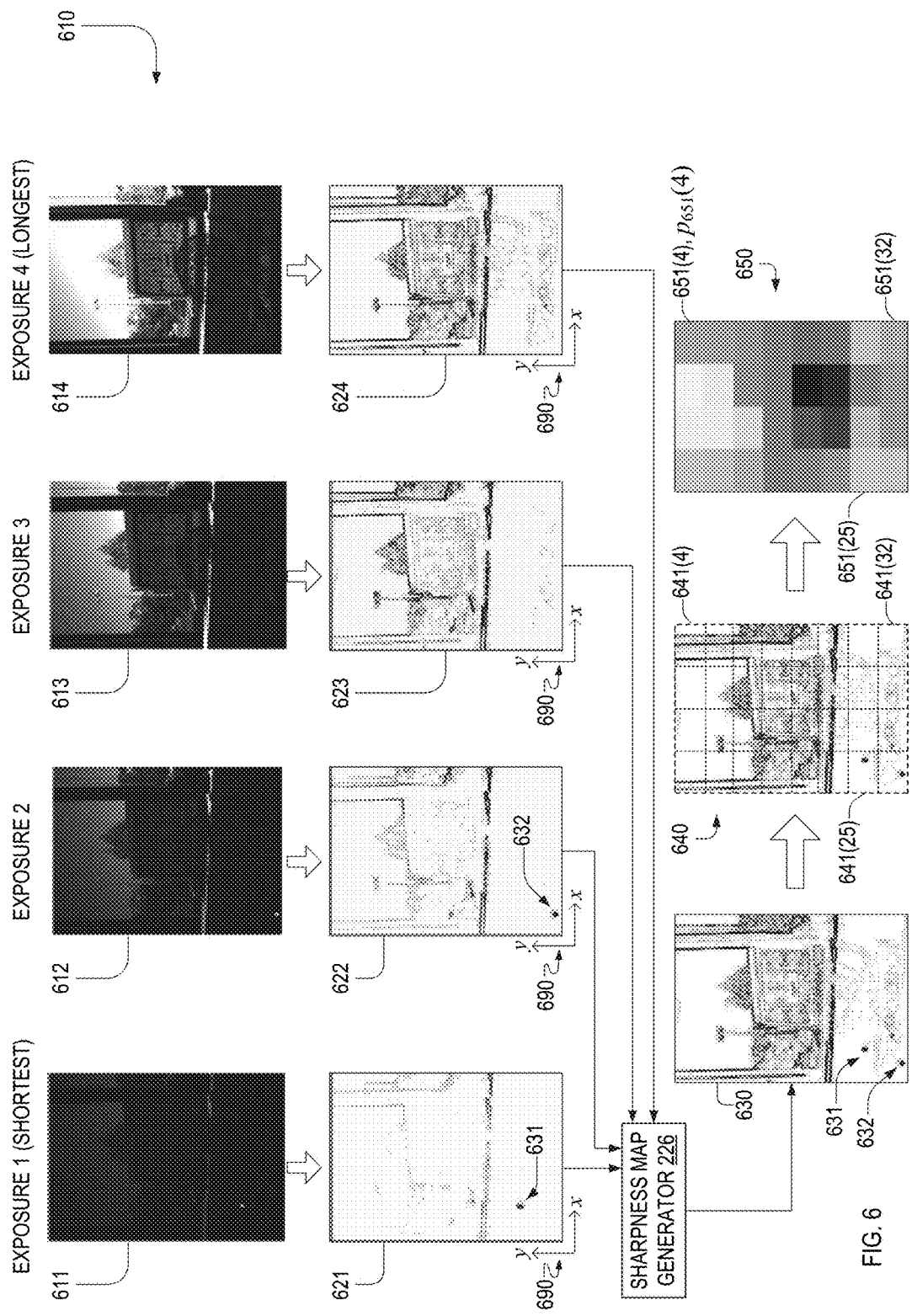
FIG. 6 illustrates an exemplary sharpness map and precursor images thereof.
Figure 7:
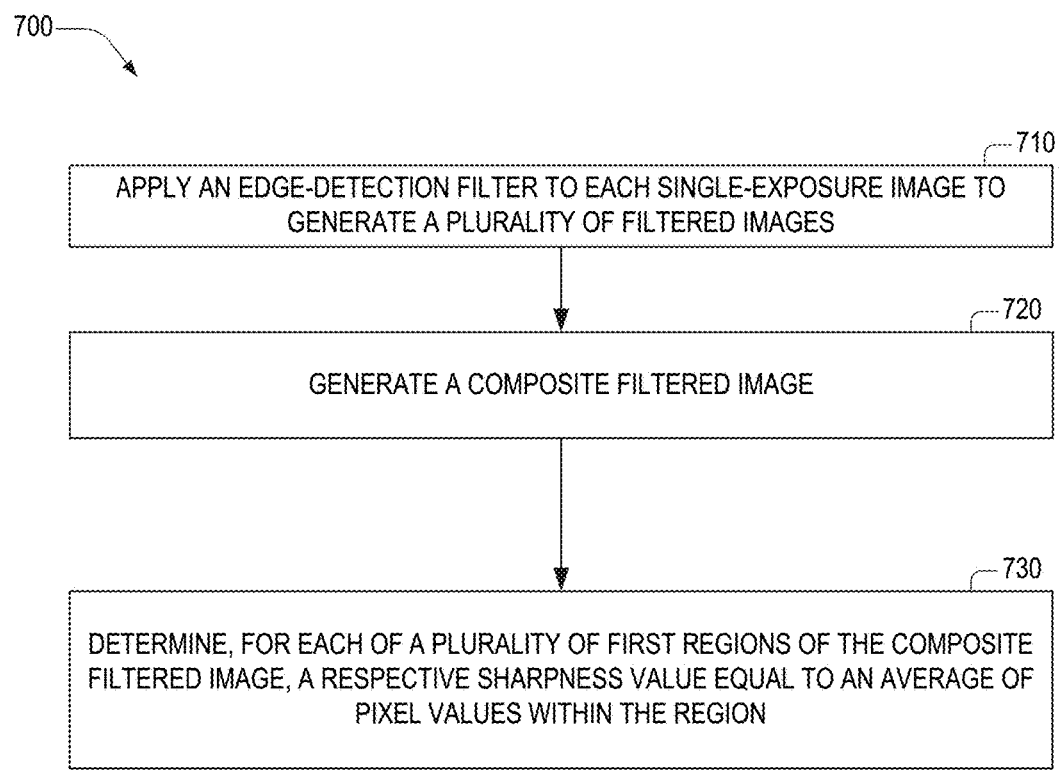
FIG. 7 is a flowchart illustrating an exemplary method for generating a sharpness map of a multiple-exposure image formed from a plurality of single-exposure images, in an embodiment.
Figure 8:
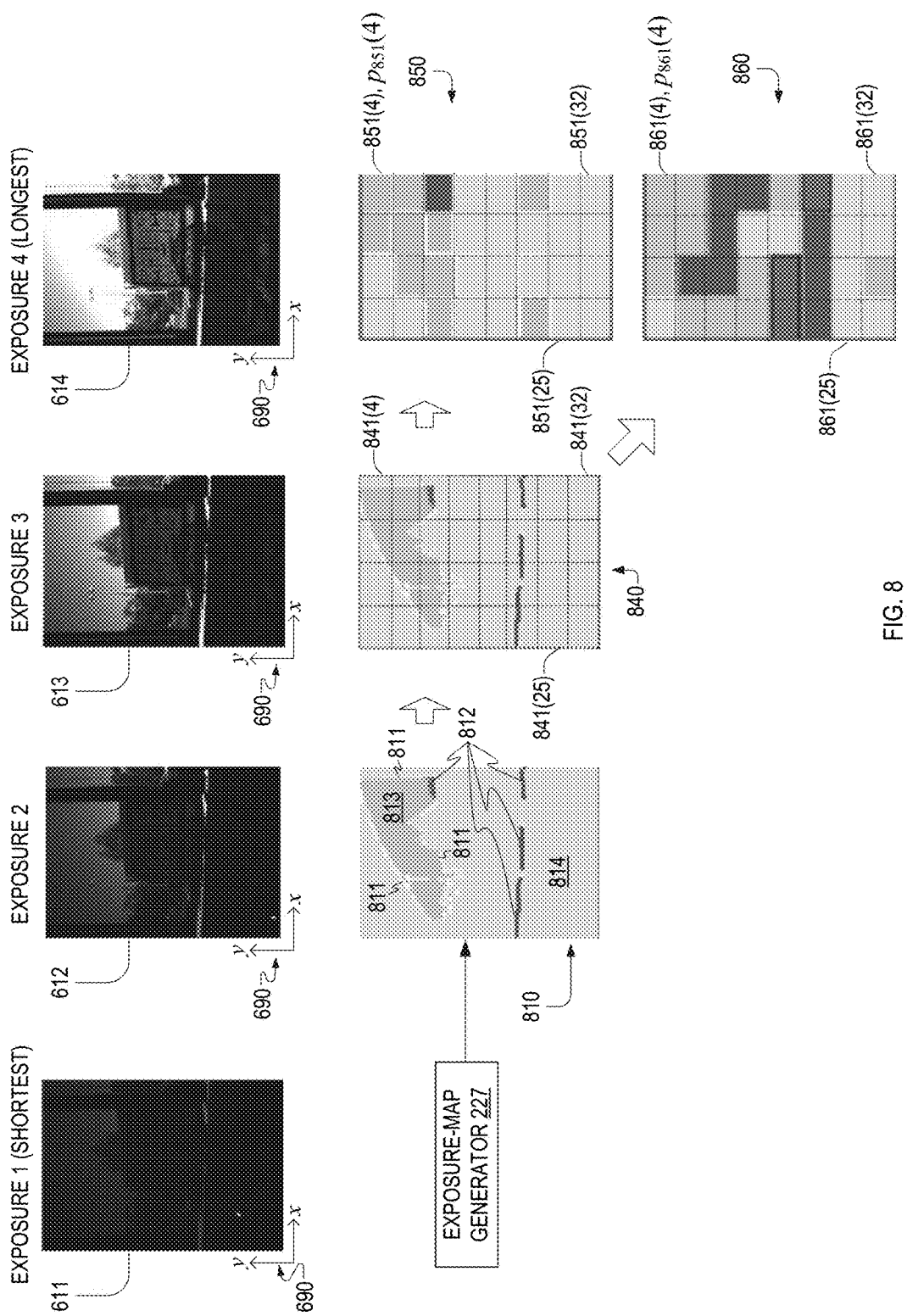
FIG. 8 illustrates an exposure map, a reduced-exposure map, and precursor images thereof, in an embodiment.
Figure 9:
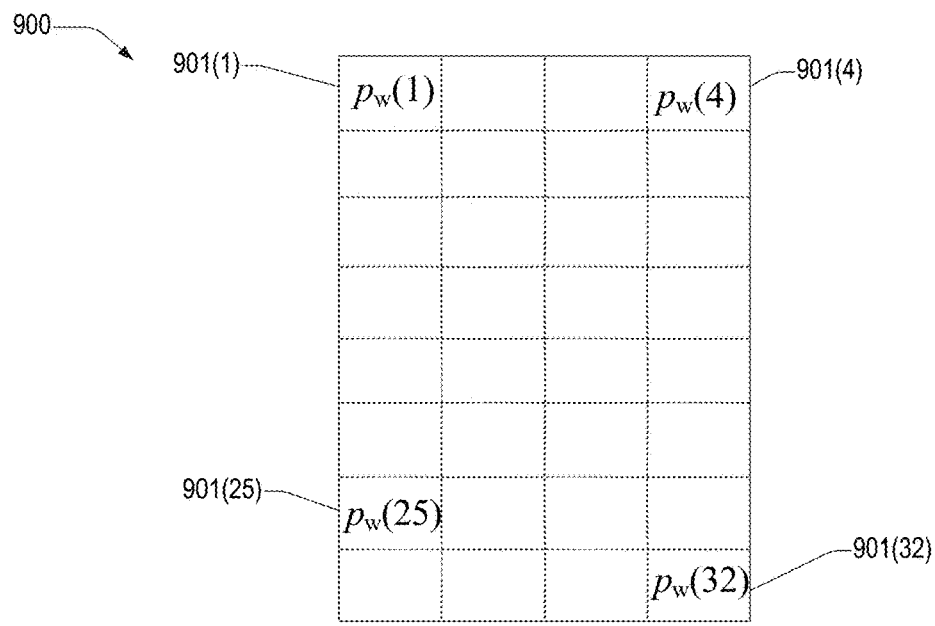
FIG. 9 illustrates an exemplary weight map based on the sharpness map of FIG. 6.
Figure 10:
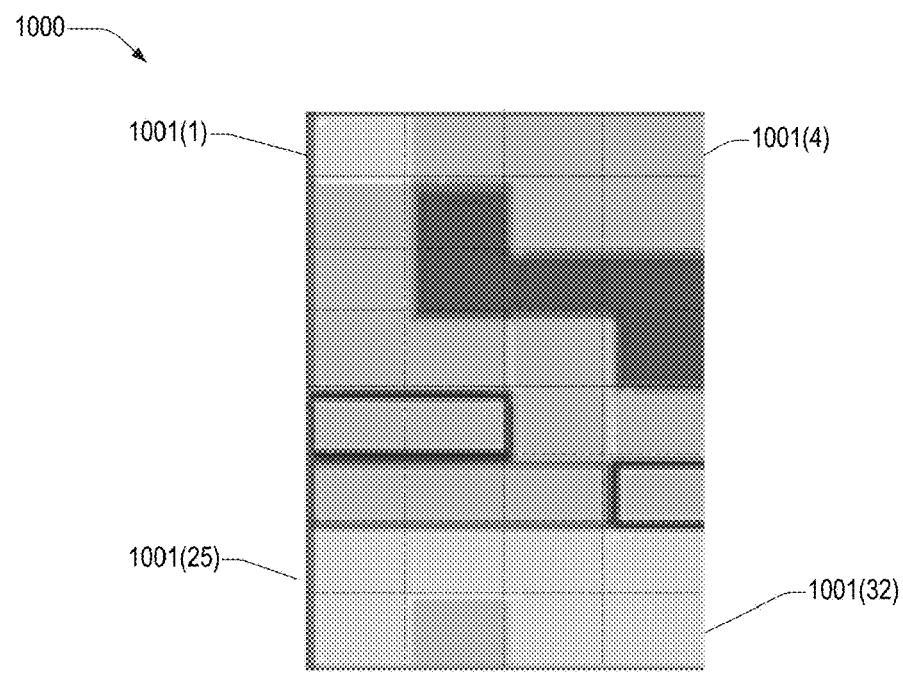
FIG. 10 illustrates an exemplary weighted-exposure map that is a sum of exposure maps of FIG. 8 weighted by the weight map of FIG. 9.

Determination of a best exposure time from candidate exposure times, e.g., $t_3$ that yields HDR image 530, includes generating a sharpness map and an exposure-value map from plurality of single-exposure images of a scene. FIGS. 6 and 7 illustrate a method for generating a sharpness map. FIGS. 8-10 illustrate a method for generating an exposure value map. For sake of brevity, exposure-value maps and exposure maps may be used interchangeably herein.

A sharpness map is a relative measure of image sharpness of plurality of regions of a multiple-exposure image. FIG. 6 illustrates a sharpness map 650 (bottom-right) formed from a single-exposure image set 610 (top row) that includes a plurality of single-exposure images of a same scene each having different exposures times. In this example, single-exposure image set 610 includes single-exposure images 611-614 that are interleaved to form multi-exposure image 402. Single-exposure images 611-614 are captured by pixels corresponding to color filter cells 301, 302, 303, and 304, respectively, of CFA 336. Without departing from the scope hereof, single-exposure image set 610 may include more or fewer than four images.

FIG. 6 includes filtered images 621-624 of the green channel of respective single-exposure images 611-614. Filtered images 621-624 are examples of filtered images 234 and may be formed from one or of more than one channels (e.g., red, green, and blue) of each respective image 611-624 without departing from the scope hereof. In this example, filtered images 621-624 were generated using a kernel h that is a discrete approximation to the Laplacian filter. Specifically, a kernel h is a 3×3 matrix (a convolution matrix) having a matrix element $h_{2,2}=8$ and all other matrix elements $h_{i,j}=-1$, $i \neq j$. Filtered images 621-624 may be generated using other edge-detection kernels without departing from the scope hereof. As such, the term feature-extracted images describes filtered images 621-624.

Filtered images 621-624 are also normalized by luminance values of their respective images 611-614 computed by luminance value generator 221. The luminance values of images 611-614 are based on the following relationship between a luminance value Y and pixel values R, G, and B or red, green, and blue sensor pixels used to capture images 401 and 402: Y=0.30R+0.59G+0.11B. Without departing from the scope hereof, coefficients of R, G, and B used to determine luminance value Y may vary from those presented.

Each filtered image 621-624 includes a plurality of respective pixel values p at location (x, y) therein, denoted herein as $p_{621}(x, y)$, $p_{622}(x, y)$, $p_{623}(x, y)$, and $p_{624}(x, y)$, respectively. Locations (x, y) are distance from to the origin of a coordinate axes 690 shown in FIG. 6. FIG. 6 also includes a composite filtered image 630 (bottom row, left), which at any coordinate (x, y) has a pixel value $p_{630}(x, y)$ equal to the maximum value of pixel values $p_{621}(x, y)$, $p_{622}(x, y)$, $p_{623}(x, y)$, and $p_{624}(x, y)$ of filtered images 621-624 respectively. For example, filtered image 621 has high pixel values, indicated as black in images 621-624, at region 631, whereas region 631 is white in remaining filtered images 622-624. Similarly, filtered image 622 has high pixel values at region 632. Accordingly, composite filtered image 630 includes these high pixel values at regions 631 and 632. Composite filtered image 630 may be generated by sharpness-map generator 226 of software 220, FIG. 2.

FIG. 6 also includes a segmented image 640 (bottom row, middle) and sharpness map 650 (bottom row, right). Segmented image 640 is composite filtered image 630 divided into a plurality of regions 641(1-$N_b$). In this example $N_b=32$. For clarity of illustration, not all regions 641 are enumerated in FIG. 6.

Sharpness-map generator 226 generates sharpness map 650 from filtered image 630. Sharpness map 650 is an example of sharpness map 236, and has a plurality of regions 651(1-$N_b$) corresponding to regions 641(1-$N_b$) respectively. Region 651(*i*) has a uniform pixel value $p_{651}(i)$ equal to the average pixel value of its corresponding region 641(*i*), where $i \in \{1, 2, \ldots, N_b\}$. For example, pixels in regions 651(4), 651(25), and 651(32) have respective pixel values $p_{651}$ equal to the average pixel values of regions 641(4), 641(25), and 641(32), respectively.

FIG. 7 is a flowchart illustrating a method 700 for generating a sharpness map of a multiple-exposure image formed from a plurality of single-exposure images. Method 700 may be implemented within one or more aspects of exposure selector 200. For example, method 700 is implemented by microprocessor 240 executing computer-readable instructions of software 220. FIGS. 6 and 7 are best viewed together in the following description.

In step 710, method 700 applies an edge-detection filter to each single-exposure image to generate a plurality of filtered images. In an example of step 710, image filter 224 applies kernel h to single-exposure images 611-614 to generate filtered images 621-624, respectively.

In step 720, method 700 generates a composite filtered image, each pixel coordinate thereof having a pixel value equal to a maximum of pixel values at the respective pixel coordinate throughout each of the plurality of filtered images. In an example of step 710, sharpness-map generator 226 generates composite filtered image 630 from filtered images 621-624. In an embodiment, sharpness-map generator 226 disregards saturated pixel values when evaluating the maximum of pixel values, at the pixel coordinate, of the plurality of filtered images.

In step 730, method 700 determines, for each of a plurality of sharpness-map regions of the composite filtered image, a respective sharpness value equal to an average of pixel values within the sharpness-map region. In an example of step 730, sharpness-map generator 226 generates sharpness map 650 by determining, for each of a plurality of non-overlapping regions 641 of segmented image 640, a respective a plurality of sharpness values 651 equal to an average of pixel values within the region.

An exposure value map illustrates the best exposure for a plurality of regions of a multiple-exposure image. The plurality of regions may be the same regions used for the sharpness map. FIG. 8 illustrates an exposure map 850, which is an example of exposure map 237. Exposure map 850 is formed from component single-exposure images 611-614, which have respective exposure indices 1-4.

FIG. 8 includes an exposure-index image 810 generated by exposure-map generator 227 from component single-exposure images 611-614. Each image 611-614 includes a plurality of respective pixel values $p_{610}$ at location (x, y) therein, denoted herein as $p_{610}(x, y, k)$, where exposure index $k \in \{1, 2, 3, 4\}$. Locations (x, y) are distance from to the origin of coordinate axes 690 shown in FIG. 8. For example, at location (x, y), image 611 has pixel value $p_{610}(x, y, 1)$ and image 612 has pixel value $p_{610}(x, y, 2)$. Exposure-index image 810 has a plurality of pixel values $p_{810}(x, y)$ equal to one of four exposure indices $k \in \{1, 2, \ldots, N_e\}$ according to Equation (2), where $N_e=4$ in this example. Quantity $p_{max}$ is a maximum pixel value corresponding to saturated exposure. For example, for an eight-bit quantization, $p_{max}=255$.

$$p_{810}(x, y) = \max_{k \in \{1,2,\ldots,N_e\}} (k[p_{610}(x, y, k) < p_{max}]) \qquad \text{Eq. (2)}$$

For example, if for a given location $(x_1, y_1)$ $p_{610}(x_1, y_1, \{1,2\}) < p_{max}$ and $p_{610}(x_1, y_1, \{k \geq 3\}) = p_{max}$, then $p_{810}(x_1, y_1) = 2$. FIG. 8 illustrates four regions 811, 812, 813, and 814 of exposure-index image 810 having exposure values $p_{810}$ equal to exposure indices 1-4 respectively. Region 811 is shown as white in FIG. 8 and includes a region bordering region 813.

Without departing from the scope hereof, each exposure value $p_{810}(x, y)$ of exposure-index image 810 may be proportional to one of four exposure times $t_{1-4}$ of single-exposure images 611-614, respectively. For example, exposure values $p_{810}(x, y)$ equal to one of exposure times $t_k \in \{1, 2, \ldots, N_e\}$ according to Equation (3).

$$p_{810}(x, y) = \max_{k \in \{1,2,\ldots,N_e\}} (t_k [p_{610}(x, y, k) < p_{max}]) \qquad \text{Eq. (3)}$$

FIG. 8 also includes a segmented index image 840, which is exposure-index image 810 divided into a plurality of regions 841(1-$N_b$) that correspond to a respective region 641 of segmented image 640. For clarity of illustration, not all regions 841 are enumerated in FIG. 8.

Exposure-map generator 227 generates exposure map 850 from exposure-index image 810. Exposure map 850 has a plurality of regions 851(1-$N_b$) corresponding to regions 841(1-$N_b$) respectively. Region 851(i) has a uniform pixel value $p_{851}(i)$ equal to the average pixel value of its corresponding region 841(i), where $i \in \{1, 2, \ldots, N_b\}$. For example, pixels in regions 851(4), 851(25), and 851(32) each have respective pixel values $p_{851}$ equal to the average pixel values of regions 841(4), 841(25), and 841(32), respectively. Exposure map 850 is illustrated with a grid superimposed thereon to show boundaries between adjacent regions 851.

Exposure-map generator 227 may also generate a reduced-exposure map 860 from exposure-index image 810. Reduced-exposure map 860 has a plurality of regions 861 (1-$N_b$) corresponding to regions 841(1-$N_b$) respectively. Region 861(i) has a uniform pixel value $p_{861}(i)$ equal to the average of the lowest decile (quantile size q=10%) of pixel values its corresponding region 841(i), where $i \in \{1, 2, \ldots, N_b\}$. For example, pixels in regions 861(4), 861(25), and 861(32) have respective pixel values $p_{851}$ equal to the average of the lowest decile of exposure values of regions 841(4), 841(25), and 841(32), respectively. Quantile size q may deviate from ten percent without departing from the scope hereof. Exposure map 860 is illustrated with a grid superimposed thereon to show boundaries between adjacent regions 861.

FIG. 9 illustrates an exemplary weight map 900 based on sharpness map 650 of FIG. 6. Weight map 900 has a plurality of regions 901(1-$N_b$) corresponding to regions 651(1-$N_b$) respectively of sharpness map 650, FIG. 6, wherein each region 651(i) has a uniform pixel value $p_{651}(i)$, $i \in \{1, 2, \ldots, N_b\}$. Region 901(i) has a uniform weight $p_w(i)=w(p_{651}(i))$, where w is a weighting function. Weighting function w is, for example, a Gaussian function, $w(p_{651})=\exp(-0.5p_{651}/\sigma^2)$, and may have other functional forms without departing from the scope hereof.

FIG. 10 illustrates an exemplary weighted-exposure map 1000 that is a sum of exposure map 850 and reduced-exposure map 860 weighted by weight map 900. Weighted-exposure map 1000 has a plurality of regions 1001(1-$N_b$) corresponding to regions 651(1-$N_b$) respectively of sharpness map 650. Region 1001(i) has a uniform exposure value $p_{1000}(i)$, given by Equation (4). Exposure map 1000 is illustrated with a grid superimposed thereon to show boundaries between adjacent regions 1001.

$$p_{1001}(i) = p_{850}(i) \cdot p_w(i) + p_{860}(i) \cdot (1 - p_w(i)) \qquad \text{Eq. (4)}$$

In the example of weighted-exposure map 1000, weight $p_w=\exp(-0.5p_{651}/\sigma^2)$, where $\sigma=200$. As $p_{651}$, a measure of high-spatial frequency amplitude in sharpness map 650, increases according to local picture sharpness, weight $p_w$ decreases with increasing picture sharpness. Consequently, weighted-exposure map 1000 is weighted such that regions thereof corresponding to sharp regions of composite filtered image 630 have lower exposure value to avoid saturation.

A weighted sum of sharpness map 650 and exposure map 1000 yields an optimal exposure value 238, also expressed herein as $E_{opt}$. For example, in Equation (5), $E_{opt}$ is an optimal exposure index $k_{opt}$, i.e., one of exposure indices k corresponding to one of exposure times $t_1$, $t_2$, $t_3$, and $t_4$ of multiple-exposure image 402, FIG. 4.

$$E_{opt} = k_{opt} = nint\left(\sum_1^{N_b} p_{1001}(i) \cdot p_{651}(i)\right) \quad \text{Eq. (5)}$$

In Eq. (5), nint(•) denotes a nearest-integer function, and may be replaced with a floor function $\lfloor \cdot \rfloor$ or a ceiling function $\lceil \cdot \rceil$ without departing from the scope hereof.

Alternatively, optimal exposure value $E_{opt}$ may be an optimal exposure time $t_{opt}$, that is, one of exposure times $t_1$, $t_2$, $t_3$, and $t_4$, as shown in Eq. (6). In Eq. (6) summation $\Sigma := \Sigma_1^{N_b} p_{1001}(i) \cdot p_{651}(i)$ and $N_e$ is the number of exposure times of multiple-exposure image 402.

$$E_{opt} = t_{opt} = \min\{|\Sigma - t_1|, |\Sigma - t_2|, \ldots, |\Sigma - t_{N_e}|\} \quad \text{Eq. (6)}$$

Optimal exposure value $E_{opt}$ is an exposure time, for example, when each exposure value of exposure maps 850 and 860 is an average exposure time, rather than an average exposure index.

Using sharpness values $p_{651}$ of sharpness map 650 and exposure values $p_{1001}$ of exposure map 1000, Eq. (5) yields $k_{opt}$=nint(3.4)=3, which means that using exposure time $t_3$ in single-exposure image 401 (instead of exposure time $t_4$) yields HDR image 530 (FIG. 5B) with higher image quality than HDR image 540 (FIG. 5A).

Figure 11:
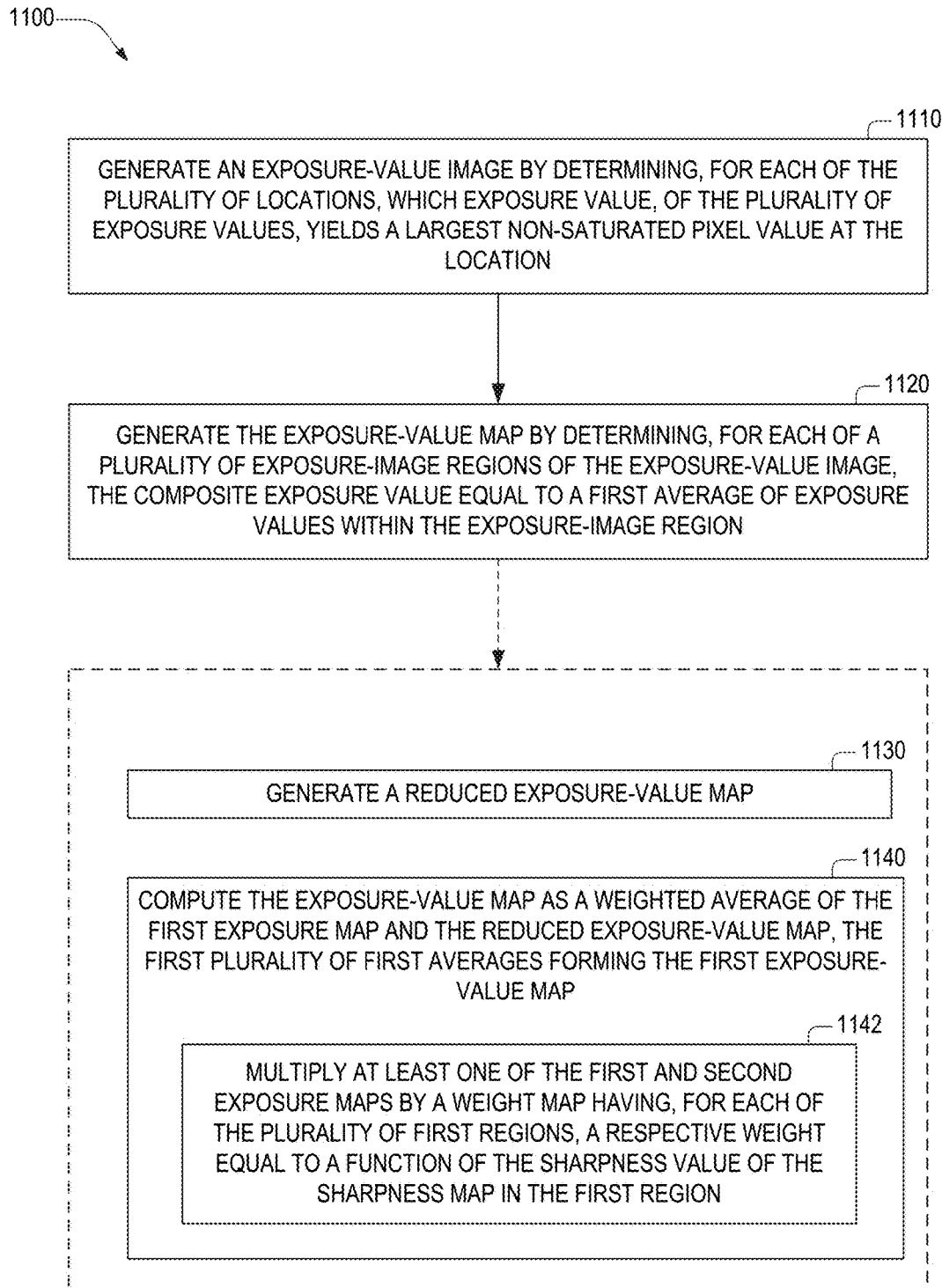
FIG. 11 is a flowchart illustrating a method for generating the exposure map of FIG. 8, in an embodiment.

FIG. 11 is a flowchart illustrating a method 1100 for generating an exposure map of a multiple-exposure image formed from a plurality of single-exposure images. Method 1100 may be implemented within one or more aspects of exposure selector 200. For example, method 1100 is implemented by microprocessor 240 executing computer-readable instructions of software 220. FIGS. 8-11 are best viewed together in the following description.

In step 1110, method 1100 generates an exposure-value image by determining, for each of the plurality of locations, the exposure value (of a plurality of exposure values) yielding the largest non-saturated pixel value at the location. Examples of exposure values include exposure times and exposure indices. In an example of step 1110, exposure-map generator 227 generates exposure-index image 810, which is an example of an exposure-value image.

In step 1120, method 1100 generates the exposure-value map by determining, for each of a plurality of exposure-image regions of the exposure-value image, the composite exposure value equal to a first average of exposure values within the exposure-image region. In an example of step 1120, exposure-map generator 1127 determines, for each region 841, a respective uniform exposure value $p_{851}$ of exposure map 850. In a second example of step 1120, exposure-map generator 1127 determines, for each region 841, a respective uniform exposure value $p_{861}$ of reduced-exposure map 860.

Method 1100 optionally includes steps 1130 and 1140. In step 1130, method 1100 generates a reduced exposure-value map by determining, for each exposure-image region, a respective one of a plurality of second averages of exposure values within the exposure-image region. For each of the plurality of exposure-image regions, the first average exceeds the second average. In an example of step 1130, exposure-map generator 1127 determines, for each region 841, a respective uniform exposure value $p_{861}$ of reduced-exposure map 860.

In step 1140, method 1100 computes the exposure-value map as a weighted average of the first exposure-value map and the reduced exposure-value map. Step 1140 optionally includes step 1142. In step 1142, method 1100 multiplies at least one of the first exposure-value map and the reduced exposure map by a weight map having, for each of the plurality of sharpness-map regions, a respective weight equal to a function of the sharpness value of the sharpness map in the sharpness-map region. In an example of step 1140 and 1142, exposure-map generator 227 generates weighted-exposure map 1000 from exposure map 850, reduced-exposure map 860, and weight map 900.

Figure 12:
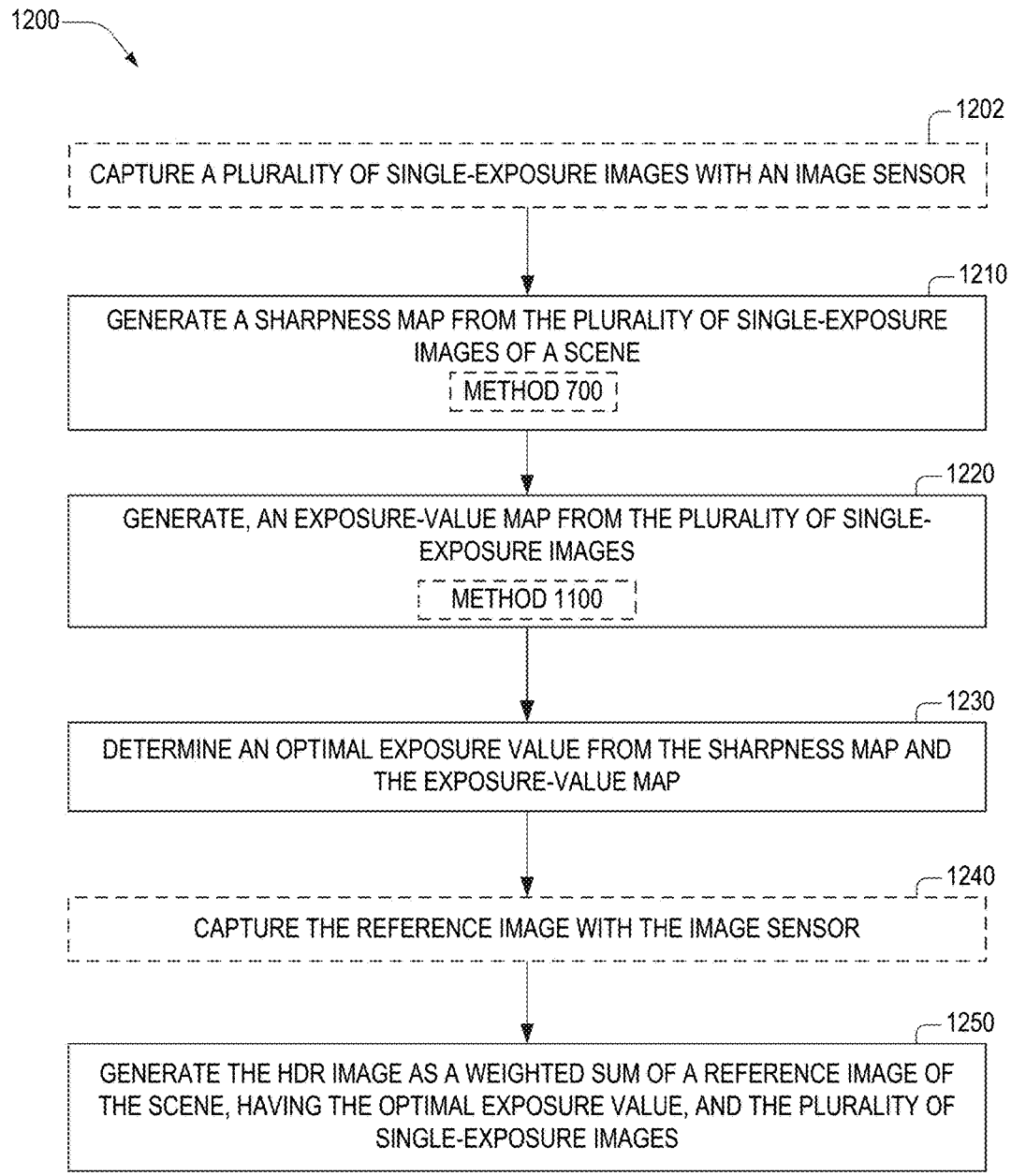
FIG. 12 is a flowchart illustrating a method for generating the HDR image of FIG. 5B, in an embodiment.

FIG. 12 is a flowchart illustrating a method for generating an HDR image from a plurality of single-exposure images of a scene, having a respective plurality of exposure times. Method 1200 may be implemented within one or more aspects of exposure selector 200. For example, method 1200 is implemented by microprocessor 240 executing computer-readable instructions of software 220. Steps 1202 and 1240 are optional.

In step 1202, method 1200 captures a plurality of single-exposure images having a respective one of a plurality of exposure values. In an example of step 1202, camera 130 captures single-exposure images 611-614 of FIG. 6. This example of step 1202 may include steps of (a) converting, with one or more analog-to-digital converters of circuitry 138, each pixel charge to a respective first digital pixel value, and (b) storing the first digital pixel values in memory 210 as image 402.

In step 1210, method 1200 generates, from a plurality feature-extracted images corresponding to the plurality of single-exposure images, a sharpness map of sharpness values of the feature-extracted images. In an example of step 1210, exposure selector 200 generates, from images 611-614, sharpness map 650 by implementing method 700.

In step 1220, method 1200 generates, from the plurality of single-exposure images, an exposure-value map of composite exposure values of the single-exposure images. In an example of step 1220, exposure selector 200 generates weighted-exposure map 1000 by implementing method 1100.

In step 1230, method 1200 determines an optimal exposure value from the sharpness map and the exposure-value map. For example, the sharpness map and the exposure-value map are added as a weighted sum. In an example of step 1230, exposure selector 228 implements Eq. (5) using sharpness values $p_{651}$ of sharpness map 650 and exposure values $p_{1001}$ of exposure map 1000 to determine $k_{opt}$=nint (3.4)=3, as described above. In a second example of step 1230, exposure selector 228 implements Eq. (6) using sharpness values $p_{651}$ of sharpness map 650 and exposure values $p_{1001}$ of exposure map 1000 to determine an optimal exposure time $t_{opt}$.

In optional step 1240, method 1200 captures the reference image with the image sensor according to the optimal exposure value. In an example of step 1240, camera 130 captures single-exposure image 401 with exposure time $t_3$. This example of step 1240 may include steps of (a) converting, with one or more analog-to-digital converters of circuitry 138, each pixel charge to a respective first digital pixel value, and (b) storing the first digital pixel values in memory 210 as image 401.

In step 1250, method 1200 generates the HDR image by combining a reference image of the scene, captured with the optimal exposure value, and at least two of the plurality of single-exposure images. The least two of the plurality of single-exposure images is, for example, each of the single-exposure images. For example, the reference image and the plurality of single-exposure images are combined as a weighted sum. In an example of step 1250, image fuser 229 generates HDR image 530.

Combinations of Features:

Features described above as well as those claimed below may be combined in various ways without departing from the scope hereof. The following examples illustrate some possible, non-limiting combinations:

(A1) A method for generating an HDR image includes (i) generating a sharpness map of sharpness values from a plurality of single-exposure images of a scene, each single-exposure image having a respective one of a plurality of exposure values, and (ii) generating, from the plurality of single-exposure images, an exposure-value map of composite exposure values of the single-exposure images. The method also includes (iii) determining an optimal exposure value from the sharpness map and the exposure-value map, and (iv) generating the HDR image by combining a reference image of the scene, captured with the optimal exposure value, and at least two of the plurality of single-exposure images.

(A2) In the method denoted by (A1), the step of generating the sharpness map may include (i) applying an edge-detection filter to each of the plurality of single-exposure images to generate a plurality of filtered images, (ii) generating a composite filtered image, each pixel coordinate thereof having a pixel value equal to a maximum of pixel values at the respective pixel coordinate throughout each of the plurality of filtered images, and (iii) determining, for each of a plurality of sharpness-map regions of the composite filtered image, a respective sharpness value equal to an average of pixel values within the sharpness-map region.

(A3) In the method denoted by (A2), in which each of the plurality of single-exposure images has a plurality of pixel values each respectively corresponding to a one of a plurality of locations in the imaged scene, the step of generating the exposure-value map may include (i) generating an exposure-value image by determining, for each of the plurality of locations, which exposure value, of the plurality of exposure values, yields a largest non-saturated pixel value at the location, and (ii) generating the exposure-value map by determining, for each of a plurality of exposure-image regions of the exposure-value image, the composite exposure value equal to a first average of exposure values within the exposure-image region (A4) In the method denoted by (A3), wherein the plurality of first averages form a first exposure-value map, the step of generating the exposure-value map may further include: (i) generating a reduced exposure-value map by determining, for each of the plurality of exposure-image regions, a respective one of a plurality of second averages of exposure values within the exposure-image region, for each of the plurality of exposure-image regions, the first average exceeding the second average, and (ii) computing the exposure-value map as a weighted average of the first exposure-value map and the reduced exposure-value ma (A5) In the method denoted by (A4), for each exposure-image region of the reduced exposure-value map, the second average may be an average of a subset of exposure values in the region. The subset excludes at least one exposure value in the exposure-image region greater than the first average.

(A6) In any method denoted by one of (A4) and (A5), in which each of the plurality of sharpness-map regions is congruent to a respective one of the plurality of exposure-image regions and corresponds to a same respective one of a plurality of image regions of one of the single-exposure images, the step of computing the exposure-value map may include weighting at least one of the first exposure-value map and the reduced exposure-value map by a weight map having, for each of the plurality of image regions, a respective weight equal to a function of the sharpness value of the sharpness map in the image region.

(A7) In any method denoted by (A6), wherein $i \in \{1, 2, \ldots\}$ denotes the plurality of image regions, the first exposure-value map has a respective plurality of exposure values $p_1(i)$, and the sharpness map's sharpness values are denoted as $s(i)$, the weight map may have a respective plurality of weights determined by a weight function $w(s(i))$.

(A8) In any method denoted by (A7), the value of weight function $w(s(i))$ may be non-increasing as sharpness value $s(i)$ increases from its minimum value to its maximum value.

(A9) In any method denoted by one of (A1) through (A8), each composite exposure value may be one of an exposure time and an exposure index of one of the plurality of single-exposure images.

(A10) In any method denoted by one of (A1) through (A9), the step of determining may include: adding the sharpness values and the composite exposure values as a weighted sum to determine the optimal exposure value.

(A11) In any method denoted by one of (A1) through (A10), the step of generating the HDR image may include generating the HDR image as a weighted sum of the reference image of the scene and the plurality of single-exposure images.

(A12) Any method denoted by one of (A1) through (A11) may further include at least one of (i) capturing the plurality of single-exposure images with an image sensor; and, after the step of determining, (ii) capturing the reference image with the image sensor according to the optimal exposure value.

(A13) In any method denoted by (A12), in which the image sensor includes a plurality of sensor pixels each having a pixel charge corresponding to a respective intensity of light from the scene incident thereon, the step of capturing the plurality of single-exposure images may include: (i) converting, with an analog-to-digital converter, each pixel charge to a respective first digital pixel value, (ii) storing the first digital pixel values in a memory communicatively coupled to a microprocessor. The step of capturing the reference image may include (i) converting, with an analog-to-digital converter, each pixel charge to a respective second digital pixel value, and (ii) storing the second digital pixel values in a memory communicatively coupled to a microprocessor.

(B1) An exposure selector includes a memory and a microprocessor. The memory stores non-transitory computer-readable instructions and is adapted to store the plurality of single-exposure images, of a scene, having a respective one of a plurality of exposure times. The microprocessor is adapted to execute the instructions to implement any method denoted by (A1) through (A11).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for generating a high-dynamic range (HDR) image comprising:
   generating a sharpness map of sharpness values from a plurality of single-exposure images of a scene, each single-exposure image having a respective one of a plurality of exposure values, the sharpness map being a relative measure image sharpness;
   generating, from the plurality of single-exposure images, an exposure-value map of composite exposure values of the single-exposure images, each composite exposure value being a quantity derived from an exposure time of pixels of a pixel array that captured the plurality of single-exposure images;
   determining an optimal exposure value from the sharpness map and the exposure-value map; and
   generating the HDR image by combining a reference image of the scene, captured with the optimal exposure value, and at least two of the plurality of single-exposure images.

2. The method of claim 1, the step of generating the sharpness map comprising:
   applying an edge-detection filter to each of the plurality of single-exposure images to generate a plurality of filtered images;
   generating a composite filtered image, each pixel coordinate thereof having a pixel value equal to a maximum of pixel values at the respective pixel coordinate throughout each of the plurality of filtered images; and
   determining, for each of a plurality of sharpness-map regions of the composite filtered image, a respective sharpness value equal to an average of pixel values within the sharpness-map region.

3. The method of claim 1, each of the plurality of single-exposure images having a plurality of pixel values each respectively corresponding to a one of a plurality of locations in the imaged scene, the step of generating the exposure-value map comprising:
   generating an exposure-value image by determining, for each of the plurality of locations, which exposure value, of the plurality of exposure values, yields a largest non-saturated pixel value at the location; and
   generating the exposure-value map by determining, for each of a plurality of exposure-image regions of the exposure-value image, the composite exposure value equal to a first average of exposure values within the exposure-image region.

4. The method of claim 3, the plurality of first averages forming a first exposure-value map, the step of generating the exposure-value map further comprising:
   generating a reduced exposure-value map by determining, for each of the plurality of exposure-image regions, a respective one of a plurality of second averages of exposure values within the exposure-image region, for each of the plurality of exposure-image regions, the first average exceeding the second average; and
   computing the exposure-value map as a weighted average of the first exposure-value map and the reduced exposure-value map.

5. The method of claim 4, for each exposure-image region of the reduced exposure-value map, the second average being an average of a subset of exposure values in the region, the subset excluding at least one exposure value in the exposure-image region greater than the first average.

6. The method of claim 4, the step of generating the sharpness map comprising:
   applying an edge-detection filter to each of the plurality of single-exposure images to generate a plurality of filtered images,
   generating a composite filtered image, each pixel coordinate thereof having a pixel value equal to a maximum of pixel values at the respective pixel coordinate throughout each of the plurality of filtered images, and
   determining, for each of a plurality of sharpness-map regions of the composite filtered image, a respective sharpness value equal to an average of pixel values within the sharpness-map region, each of the plurality of sharpness-map regions being congruent to a respective one of the plurality of exposure-image regions and corresponding to a same respective one of a plurality of image regions of one of the single-exposure images, the step of computing the exposure-value map comprising:
   weighting at least one of the first exposure-value map and the reduced exposure-value map by a weight map having, for each of the plurality of image regions, a respective weight equal to a function of the sharpness value of the sharpness map in the image region.

7. The method of claim 6, wherein $i \in \{1, 2, \ldots\}$ denotes the plurality of image regions, the first exposure-value map has a respective plurality of exposure values $p_1(i)$, and the sharpness map's sharpness values being denoted as $s(i)$:
   the weight map having a respective plurality of weights determined by a weight function $w(s(i))$.

8. The method of claim 7, the value of weight function $w(s(i))$ being non-increasing as sharpness value $s(i)$ increases from its minimum value to its maximum value.

9. The method of claim 1, the step of determining comprising: adding the sharpness values and the composite exposure values as a weighted sum to determine the optimal exposure value.

10. The method of claim 1, step of generating the HDR image comprising: generating the HDR image as a weighted sum of the reference image of the scene and the plurality of single-exposure images.

11. The method of claim 1, further comprising, after the step of determining:
    capturing the reference image with an image sensor according to the optimal exposure value.

12. The method of claim 11, the image sensor including a plurality of sensor pixels each having a pixel charge corresponding to a respective intensity of light from the scene incident thereon,
    the step of capturing the plurality of single-exposure images comprising:
    converting, with an analog-to-digital converter, each pixel charge to a respective first digital pixel value; and
    storing the first digital pixel values in a memory communicatively coupled to a microprocessor; and
    the step of capturing the reference image comprising:
    converting, with an analog-to-digital converter, each pixel charge to a respective second digital pixel value; and
    storing the second digital pixel values in a memory communicatively coupled to a microprocessor.

13. An exposure selector for generating a high-dynamic range (HDR) image, comprising:
    a memory storing non-transitory computer-readable instructions and adapted to store a plurality of single-exposure images, of a scene, having a respective one of a plurality of exposure times;
    a microprocessor adapted to execute the instructions to:

generate, from the plurality of single-exposure images of the scene, a sharpness map of sharpness values of the single-exposure images, the sharpness map being a relative measure image sharpness, generate, from the plurality of single-exposure images, an exposure-value map of composite exposure values of the single-exposure images, each composite exposure value being a quantity derived from at least one of an exposure time of pixels of a pixel array that captured the plurality of single-exposure images, determine an optimal exposure value from the sharpness map and the exposure-value map, and generate the HDR image by combining a reference image of the scene, captured with the optimal exposure value, and at least two of the plurality of single-exposure images.

14. The exposure selector of claim 13, the microprocessor being further adapted to execute the instructions to, when generating the sharpness map:

apply an edge-detection filter to each of the plurality of single-exposure images to generate a plurality of filtered images;

generate a composite filtered image, each pixel coordinate thereof having a pixel value equal to a maximum of pixel values at the respective pixel coordinate throughout each of the plurality of filtered images; and determine, for each of a plurality of sharpness-map regions of the composite filtered image, a respective sharpness value equal to an average of pixel values within the sharpness-map region.

15. The exposure selector of claim 13, each of the plurality of single-exposure images having a plurality of pixel values each respectively corresponding to a one of a plurality of locations in the imaged scene, the microprocessor being further adapted to execute the instructions to, when generating the exposure-value map:

generate an exposure-value image by determining, for each of the plurality of locations, which exposure value, of the plurality of exposure values, yields a largest non-saturated pixel value at the location; and generate the exposure-value map by determining, for each of a plurality of exposure-image regions of the exposure-value image, the composite exposure value equal to a first average of exposure values within the exposure-image region.

16. The exposure selector of claim 15, the plurality of first averages forming a first exposure-value map, the microprocessor being further adapted to execute the instructions to, when generating the exposure-value map:

generate a reduced exposure-value map by determining, for each of the plurality of exposure-image regions, a respective one of a plurality of second averages of exposure values within the exposure-image region, for each of the plurality of exposure-image regions, the first average exceeding the second average; and compute the exposure-value map as a weighted average of the first exposure-value map and the reduced exposure-value map.

17. The exposure selector of claim 16, for each exposure-image region of the reduced exposure-value map, the second average being an average of a subset of exposure values in the region, the subset excluding at least one exposure value in the exposure-image region greater than the first average.

18. The exposure selector of claim 16, the microprocessor being further adapted to execute the instructions to, when generating the sharpness map:

apply an edge-detection filter to each of the plurality of single-exposure images to generate a plurality of filtered images, generate a composite filtered image, each pixel coordinate thereof having a pixel value equal to a maximum of pixel values at the respective pixel coordinate throughout each of the plurality of filtered images, and determine, for each of a plurality of sharpness-map regions of the composite filtered image, a respective sharpness value equal to an average of pixel values within the sharpness-map region, each of the plurality of sharpness-map regions being congruent to a respective one of the plurality of exposure-image regions and corresponding to a same respective one of a plurality of image regions of one of the single-exposure images; the microprocessor being further adapted to execute the instructions to, when generating the exposure-value map:

weighting at least one of the first exposure-value map and the reduced exposure-value map by a weight map having, for each of the plurality of image regions, a respective weight equal to a function of the sharpness value of the sharpness map in the image region.

19. The exposure selector of claim 18, wherein $i \in \{1, 2, \ldots\}$ denotes the plurality of image regions, the first exposure-value map has a respective plurality of exposure values $p_1(i)$, and the sharpness map's sharpness values being denoted as $s(i)$:

the weight map having a respective plurality of weights determined by a weight function $w(s(i))$.

20. The exposure selector of claim 19, the value of weight function $w(s(i))$ being non-increasing as sharpness value $s(i)$ increases from its minimum value to its maximum value.

21. The method of claim 13, the microprocessor being further adapted to execute the instructions to, when combining:

add the sharpness values and the composite exposure values as a weighted sum to determine the optimal exposure value.

22. The method of claim 13, the microprocessor being further adapted to execute the instructions to, when generating the HDR image:

generate the HDR image as a weighted sum of the reference image of the scene and the plurality of single-exposure images.

23. An exposure selector for generating a high-dynamic range (HDR) image, comprising:

a memory storing non-transitory computer-readable instructions and adapted to store a plurality of single-exposure images, of a scene, having a respective one of a plurality of exposure times;

a microprocessor adapted to execute the instructions to:

generate, from the plurality of single-exposure images of the scene, a sharpness map of sharpness values of the single-exposure images, generate, from the plurality of single-exposure images, an exposure-value map of composite exposure values of the single-exposure images, determine an optimal exposure value from the sharpness map and the exposure-value map, and generate the HDR image by combining a reference image of the scene, captured with the optimal exposure value, and at least two of the plurality of single-exposure images the microprocessor being further adapted to execute the instructions to, when generating the sharpness map:

apply an edge-detection filter to each of the plurality of single-exposure images to generate a plurality of filtered images;
generate a composite filtered image, each pixel coordinate thereof having a pixel value equal to a maximum of pixel values at the respective pixel coordinate throughout each of the plurality of filtered images; and
determine, for each of a plurality of sharpness-map regions of the composite filtered image, a respective sharpness value equal to an average of pixel values within the sharpness-map region.

\* \* \* \* \*